United States Patent
Hanamori

(10) Patent No.: US 7,546,481 B2
(45) Date of Patent: Jun. 9, 2009

(54) CLOCK CONTROL CIRCUIT THAT GENERATES AND SELECTS ONE OF A DIVIDED CLOCK SIGNAL AND A MULTIPLIED CLOCK SIGNAL AS A BUS CLOCK SIGNAL

(75) Inventor: Hiroyuki Hanamori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 493 days.

(21) Appl. No.: 11/368,417

(22) Filed: Mar. 7, 2006

(65) Prior Publication Data
US 2006/0242446 A1 Oct. 26, 2006

(30) Foreign Application Priority Data
Apr. 22, 2005 (JP) ............................. 2005-124459

(51) Int. Cl.
*G06F 1/04* (2006.01)
*G06F 1/08* (2006.01)

(52) U.S. Cl. ..................... 713/500; 713/501; 713/502

(58) Field of Classification Search .................. 713/500
See application file for complete search history.

(56) References Cited

U.S. PATENT DOCUMENTS
6,779,125 B1 * 8/2004 Haban ..................... 713/500

FOREIGN PATENT DOCUMENTS
JP 2002-215570 8/2002

* cited by examiner

*Primary Examiner*—Nitin C Patel
(74) *Attorney, Agent, or Firm*—Volentine & Whitt, P.L.L.C.

(57) ABSTRACT

A clock control circuit including a divider unit for dividing a master clock signal at a falling timing of the same to generate a divided clock signal, a multiplier unit for multiplying the master signal by n at a rising timing of the same, and thinning out an n-th clock pulse to generate a multiplied clock signal, and a selector unit for selecting a bus clock signal from multiplied clock signals at a variety of timings, derived from the multiplied clock signal, and the divided clock signal in accordance with a selection signal, and supplying the selected signal to a processor.

10 Claims, 6 Drawing Sheets

PRIOR ART

CLOCK CONTROL CIRCUIT THAT GENERATES AND SELECTS ONE OF A DIVIDED CLOCK SIGNAL AND A MULTIPLIED CLOCK SIGNAL AS A BUS CLOCK SIGNAL

BACKGROUND OF THE INVENTION

1. Field of the Invention

The present invention relates to a clock control circuit for generating a plurality of clock signals in a semiconductor integrated circuit.

2. Description of the Related Background Art

FIG. 1 is a schematic diagram of a conventional data holding circuit shown in Japanese Patent Application Kokai No. 2002-215570. The data holding circuit comprises: a D-latch circuit 1 for holding and outputting a data signal D1$i$ at a rising edge of a clock signal CK1; a D-latch circuit 2 for holding and outputting a data signal D2$i$ at a falling edge of the clock signal CK1; a D-latch circuit 3 for holding and outputting a data signal D3$i$ at a rising edge of a clock signal CK2; and a D-latch circuit 4 for holding and outputting a data signal D4$i$ at a falling edge of the clock signal CK2. The signals held in these D-latch circuits 1-4 are output as data signals D1-D4, respectively, through buffers B1-B4.

On the other hand, the clock signals CK1, CK2 are generated by dividing a reference clock signal CK generated by a reference clock output circuit 5 by two at a rising timing and a falling timing, respectively, using flip-flops 6, 7.

In the data holding circuit, noise is generated by a holding operation of each of the D-latch circuits 1-4. The time of the noise generation spreads out because the D-latch circuits 1-4 perform the data signal holding operations at different times, respectively. In this way, the intensity of the noise is reduced, as compared with that which would be generated when the D-latch circuits 1-4 operate simultaneously at the same timing, thus making it possible to reduce the influence of erroneous operations due to the noise.

However, the data holding circuit has the following problems.

(1) The reference clock signal required by the data holding circuit is fast as compared with the rates of the data signals, resulting in larger power consumption.

(2) A plurality of clock supply paths are required, leading to difficulties in the layout due to a correction of the clock signals for skew.

(3) When the plurality of clock supply paths are switched, a circuit configuration therefor is complicated and large in scale.

SUMMARY OF THE INVENTION

It is an object of the present invention to provide a clock control circuit which is capable of facilitating the switching of frequency and timing, and selecting a clock signal which entails less operation noise without requiring a fast reference clock signal.

The present invention provides a clock control circuit built in a semiconductor integrated circuit including an input/output circuit for performing an input/output operation based on an external master clock signal, and a processor for performing a control operation in accordance with a program, to generate a reference bus clock signal which is the basis for the operation of the processor, based on the master clock signal. The clock control circuit is characterized by comprising a divider unit which divides the master clock signal in response to a falling timing of the master clock signal to generate a divided clock signal, a multiplier unit which multiplies the frequency of the master clock signal by n (where n is an integer equal to or larger than three) to generate a multiplied signal synchronized to a rising timing of the master clock signal, a counter which is reset each time the master clock signal rises, and counts up one by one each time the multiplied signal rises, a comparator which outputs a comparison result signal at a first level when a count value of the counter is less than n−1, and sets the comparison result signal to a second level different from the first level when the count value is n−1, a logical OR gate which outputs a logical OR of the comparison result signal and the multiplied signal to output a multiplied clock signal, and a selector unit which selects one of the divided clock signal and the multiplied clock signal and outputs the selected one as the reference bus clock signal.

In the present invention, since the clock control circuit has the divider unit for dividing a master clock at a falling timing of the same to generate a divided clock signal, the divided clock will not rise at the same timing at which the master clock signal rises.

Also, the clock control circuit has the counter for counting the multiplied signal generated by multiplying the master clock signal by n, the comparator for setting a comparison result to the second level when the count value is n−1, and the logical OR gate for taking a logical OR of the comparison result signal and multiplied signal to output a multiplied clock signal. With these components, the multiplied clock signal will not rise at the same timing at which the master clock signal rises. Further, one of the divided clock signal and multiplied clock signal can be selected by the selection signal as a bus clock signal.

Accordingly, the input/output circuit which performs an input/output operation based on the master clock signal, the processor which operates based on the bus clock signal, and the like operate at dispersed timings, thus producing such effects as a reduction in the intensity of noise due to operations synchronized to the clocks, and a reduction in the influence of malfunctions due to the noise.

Also, since a fast reference clock signal is not required, an increase in power consumption can be restrained. Further, since only one type of bus clock signal is supplied to the processor and the like, no need exists for a plurality of clock supply paths or a circuit for switching the paths, thus making it possible to simplify the circuit configuration.

The clock control circuit further comprises a first selector for selecting one of the output signal of the logical OR gate and the multiplied signal in accordance with a first selection signal and outputting the selected one as a multiplied bus clock signal, and a second selector for selecting one of the divided clock signal and the multiplied bus clock signal in accordance with a second selection signal, and outputting the selected one as the reference bus clock signal. In this way, since a multiplied clock signal can be selected from clock signals having four different timings, it is possible to readily select a clock signal associated with a timing at which malfunctions are less likely to occur. Further, by providing a resister for setting a division value, a multiplication value, a selection signal and the like, an optimal state can be set by a program.

The above and other objects and novel features of the present invention will be more fully apparent from the following description of the preferred embodiments when read with reference to the accompanying drawings. However, the drawings are not intended to limit the scope of the invention, but are merely provided for illustrative purposes.

DETAILED DESCRIPTION OF THE INVENTION

In the following, embodiments of the present invention will be described in detail with reference to the drawings.

Figure 1:
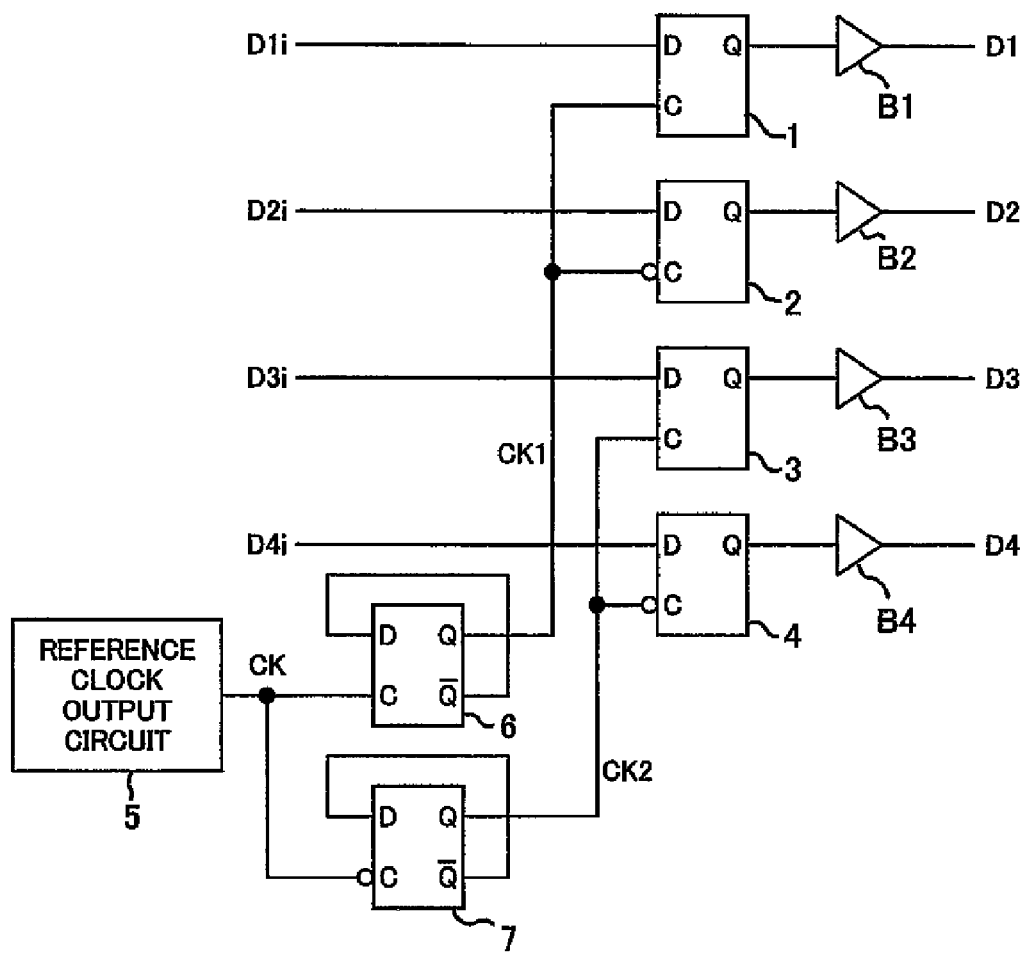
FIG. 1 is a diagram showing the configuration of a conventional data holding circuit.
Figure 2:
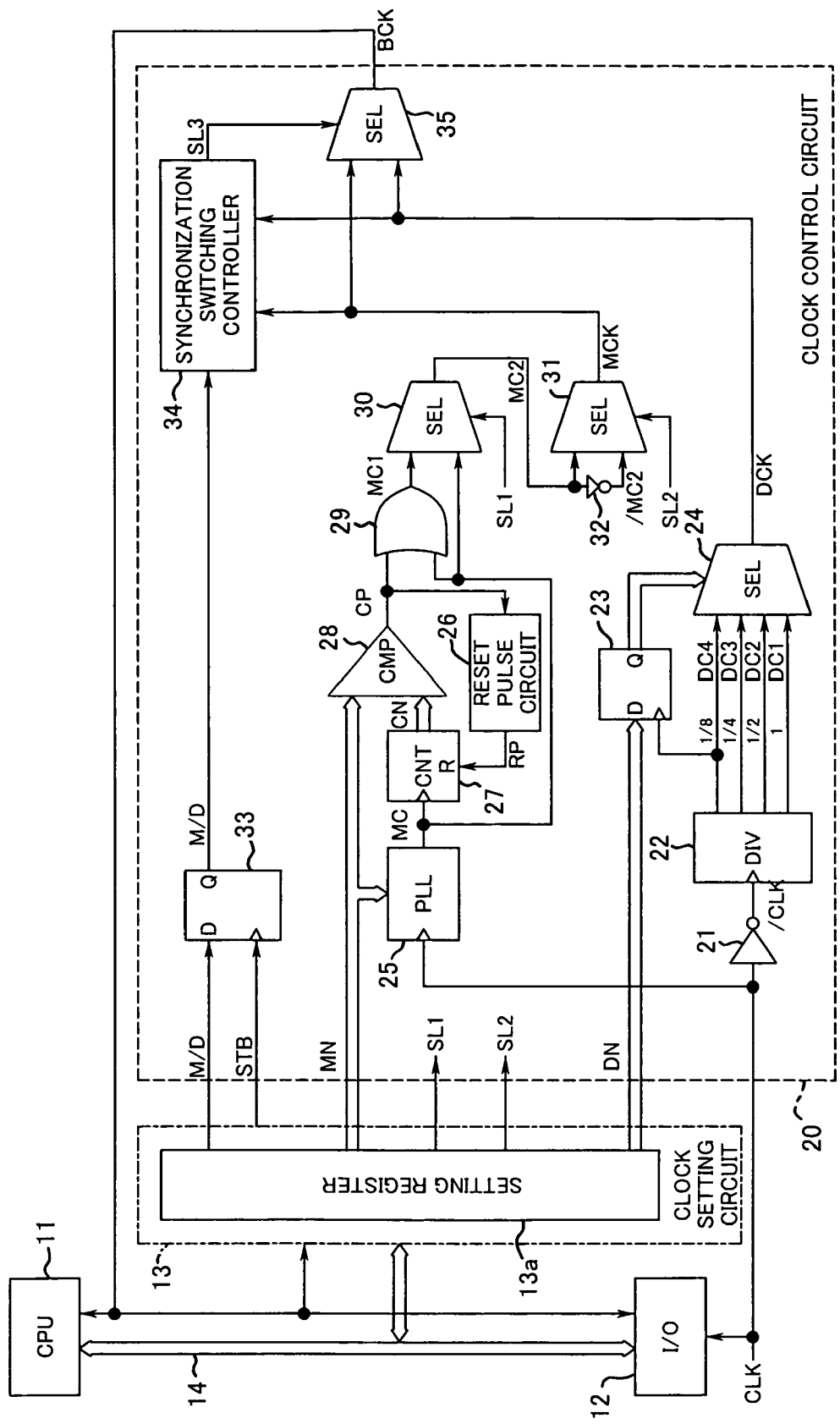
FIG. 2 is a diagram showing the configuration of a clock control circuit according to one embodiment of the present invention.

FIG. 2 is a schematic diagram of a clock control circuit showing an embodiment of the present invention. The clock control circuit 20 is built in a semiconductor integrated circuit, and generates a bus clock signal BCK for use within the semiconductor integrated circuit based on an external master clock CLK.

The semiconductor integrated circuit comprises, other than the clock control circuit 20, a processor (CPU) 11 for generally controlling the semiconductor integrated circuit in accordance with a program stored in a memory or the like, not shown; an input/output circuit (I/O) 12 for performing input/output operations with an external device (not shown); a clock setting circuit 13 for setting a clock for the clock control circuit 20; and the like. The processor 11, input/output circuit 12, clock setting circuit 13 and the like are interconnected through an internal bus 14, and are supplied with the bus clock signal BCK, which is the basis of operation timing, from the clock control circuit 20.

The input/output circuit 12 receives the master clock signal CLK, from the external source, at a frequency required to transfer data to/from the external device. Also, the clock setting circuit 13 has a setting register 13a for holding the contents of settings provided from the processor 11 to the clock control circuit 20.

The clock control circuit 20 is composed of a divider unit for dividing the external master clock signal CLK to generate a divided clock signal; a multiplier unit for multiplying the master clock signal CLK to generate a multiplied clock signal; and a selector unit for selecting one of the divided clock signal and the multiplied clock signal, which is output as the bus clock signal BCK.

The divider unit comprises an inverter 21, a divider (DIV) 22, a data holding register 23, and a selector (SEL) 24.

The inverter 21 inverts the master clock signal applied from the outside, and supplies the inverted master clock signal to the divider 22. The divider 22, which is, for example, a two-digit binary counter, divides the master clock CLK at a timing at which the output signal/CLK of the inverter 21 rises from level "L" to level "H" (i.e., the master clock signal CLK falls) to output divided clock signals DC1, DC2, DC3, DC4 which have the frequencies, ½, ½, ¼, ⅛ as high as that of the master clock signal CLK, respectively.

The data holding register 23 holds and outputs a division value DN provided from the setting register 13a at a rising timing of the divided clock signal DC4. The output side of the data holding register 23 is connected to a selection terminal of the selector 24. The selector 24 selects one of the divided clock signals DC1, DC2, DC3, DC4 output from the divider 22 in accordance with the division value DN supplied from the data holding register 23, and outputs the selected one as a divided clock signal DCK.

The multiplier unit comprises a multiplier (PLL) 25, a reset pulse circuit 26, a counter (CNT) 27, a comparator (CMP) 28, and a logical OR gate (OR) 29.

The multiplier 25, which is, for example, a phase locked loop circuit, receives the master clock signal CLK, and multiplies the frequency of the master clock signal by a multiplication value MN supplied from the setting register 13a (note that the output frequency is (multiplication value MN+1) times higher) to generate a multiplied clock signal MC which has a rising timing matching with a rising edge of the master clock signal CLK. The reset pulse circuit 26 generates a reset pulse RP in response to a consistent comparison result signal CP, and supplies the reset pulse RP to the counter 27 as a reset signal.

The counter 27 counts up one by one at a rising timing of the multiplied clock signal MC supplied from the multiplier 25 to output its count value CN. When the reset pulse RP is supplied, the counter 27 returns the count value CN to zero. The count value CN is supplied to the comparator 28.

The comparator 28 compares the count value CN output from the counter 27 with the multiplication value MN supplied from the setting register 13a, and outputs the comparison result signal CP at "L" (first level) when the count value CN is smaller than the multiplication value MN, and the comparison result signal CP at "H" (second level) when the count value C is the same as or larger than the multiplication value MN.

The logical OR gate 29 operates a logical OR of the comparison result signal CP output from the comparator 28 and the multiplied clock signal MC output from the multiplier 25 to output a multiplied clock signal MC1.

The selector unit comprises selectors 30, 31, 35, an inverter 32, a data latch circuit 33, and a synchronization switching controller 34.

The selector 30 selects one of the multiplied clock signal MC supplied from the multiplier 25 and the multiplied clock signal MC1 output from the logical OR gate 29 in accordance with a selection signal SL1 supplied from the setting register 13a, and outputs the selected one as a multiplied clock signal MC2. For example, the multiplied clock signal MC is selected when the selection signal SL1 is at "L" while the multiplied clock signal MC1 is selected when the selection signal SL1 is at "H."

The selector 31 selects either the multiplied clock signal MC2 output from the selector 30 or a signal/MC2 generated by inverting the multiplied clock signal MC2 by the inverter 32 in accordance with a selection signal SL2 supplied from the setting register 13a, and outputs the selected signal as a multiplied clock signal MCK. For example, the multiplied clock signal MC2 is selected when the selection signal SL2 is at "L" while the signal/MC2 is selected when the selection signal SL2 is at "H."

The data latch circuit 33 holds and outputs a selection signal M/D supplied from the setting register 13a in accordance with a strobe signal STB supplied from the clock setting circuit 13. For example, the selection signal M/D is set to "L" when the divided clock signal is selected, and set to "H" when the multiplied clock signal is selected. The output side of the data latch circuit 33 is connected to the synchronization switching controller 34.

The synchronization switching controller 34 corrects the selection signal M/D supplied through the data latch circuit 33 from the clock setting circuit 13 at an arbitrary timing to a selection signal SL3 which is synchronized to the divided clock signal DCK and multiplied clock signal MCK. The selection signal SL3 is supplied to a selection terminal of the selector 35.

The selector 35 selects the divided clock signal DCK or multiplied clock signal MCK in accordance with the selection signal SL3 supplied from the synchronization switching controller 34, and outputs the selected signal as the bus clock signal BCK. For example, the divided clock signal DCK is selected when the selection signal SL3 is at "L" while the multiplied clock signal MCK is selected when the selection signal SL3 is at "H." The bus clock signal BCK output from the selector 35 is supplied to the processor 11, input/output circuit 12, clock setting circuit 13, and the like.

Figure 3:
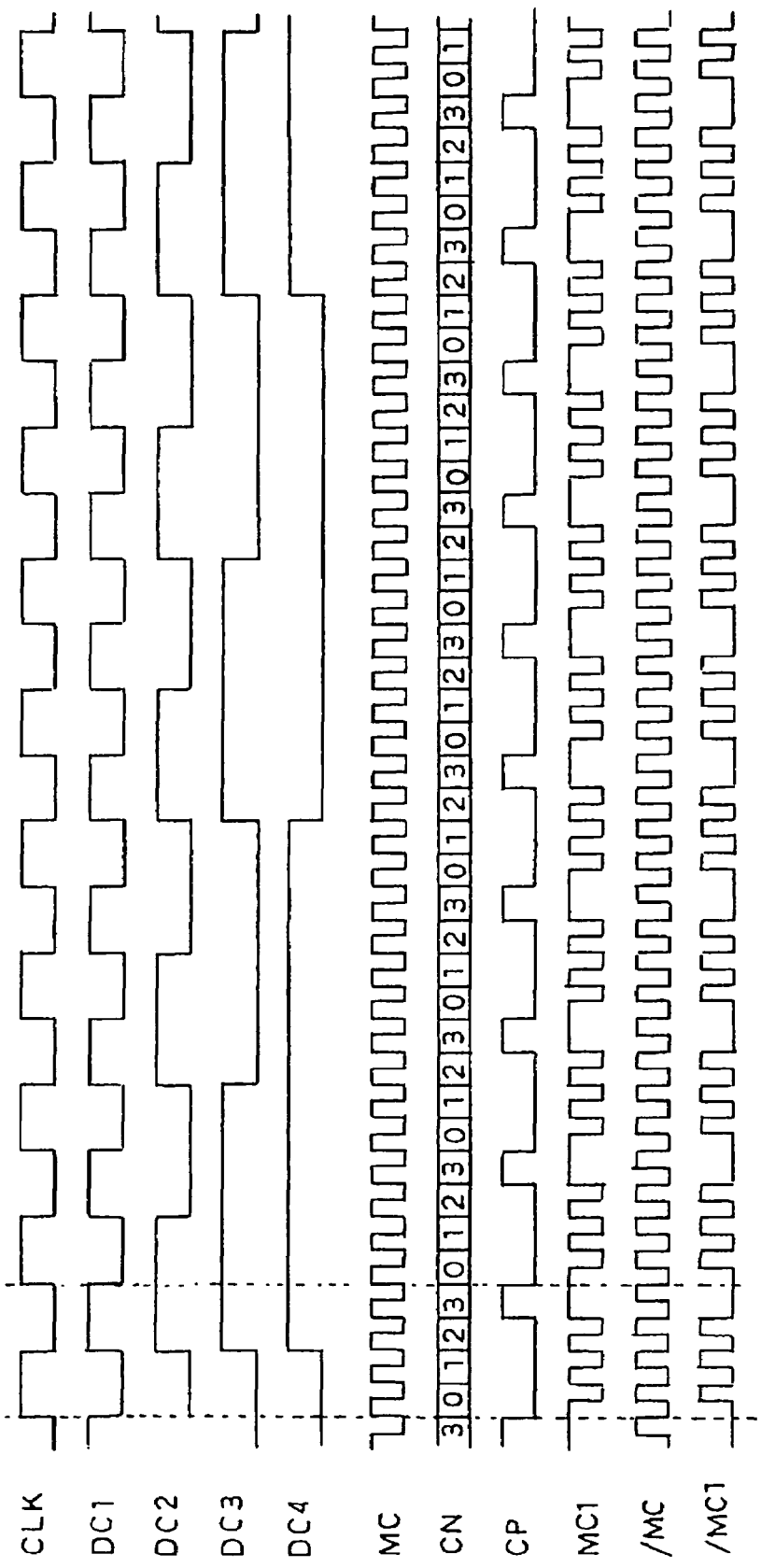
FIG. 3 is a signal waveform chart showing the operation of the clock control circuit in FIG. 2.

FIG. 3 shows signal waveforms representing the operation of the clock control circuit shown in FIG. 2. In the following, the operation of the clock control circuit in FIG. 2 will be described with reference to FIG. 3.

Assume herein that the division value DN set in the setting register 13a is binary "01" and the multiplication value MN is binary "11."

The master clock signal CLK is inverted by the inverter 21, and then supplied to the divider 22. In this way, the divided clock signal DC1 at the same frequency as the master clock signal CLK, the divided clock signal DC2 at a frequency half as high as the master clock signal CLK, the divided clock signal DC3 at a frequency one quarter as high as the master clock signal CLK, and the divided clock signal DC4 at a frequency one eighth as high as the master clock signal CLK are output from the divider 22 and supplied to the selector 24.

The division value DN is supplied to the data holding register 23, and held in the data holding register 23 at a rising timing of the divided clock signal DC4. Therefore, binary "01" is held in the data holding register 23, and is supplied as a selection signal for the selector 24. In this way, the divided clock signal DC2 is selected by the selector 24 and is output from the selector 24 as the divided clock signal DCK.

Further, the master clock signal CLK is supplied to the multiplier 25 and reset pulse circuit 26. In this way, the multiplier 25 generates the multiplied clock signal MC which has a frequency four times higher than the master clock signal CLK, and rises at the same time as a rising edge of the master clock signal. Also, the reset pulse circuit 26 generates the reset pulse RP in synchronism with a rising edge of the multiplied clock signal MC. The multiplied clock signal MC and reset pulse RP are supplied to the counter 27. In this way, the count value CN output from the counter 27 is set to "0" when the master clock signal CLK rises, and is subsequently incremented by one each time the multiplied clock signal MC rises, to "1," "2," "3" and so forth. Then, as the master clock signal CLK again rises, the count value CN returns to "0." It should be noted that the counter 27 generally starts the count value CN from "0" and therefore presents a count value which is smaller by "1" than the actual number of pulses.

The count value CN and multiplication value MN are supplied to the comparator 28 for comparison. In this way, the comparison result signal CP goes to "L" when the count value CN is from "0" to "2," and the comparison result signal CP goes to "H" when the count value CN is "3." The logical OR gate 29 operates a logical OR of the comparison result signal CP and multiplied clock signal MC to output the multiplied clock signal MC1 from the logical OR gate 29.

In this way, the multiplied clock signal MC1 has a frequency three times higher than the master clock signal CLK (strictly speaking, however, this cannot be called the frequency because respective pulses do not have the same width). Also, the multiplied clock signal MC1 is at "H" when the master clock signal CLK rises, thereby preventing the master clock signal CLK from rising at the same timing as the multiplied clock signal MC1. It should be noted that even though the respective pulses do not have the same width, there is no problem in the operation of a circuit which operates in response to a rising and a falling timing of a clock signal.

On the other hand, when the selection signal M/D is set in the setting register 13a, this causes the strobe signal STB to be output from the clock setting circuit 13. In this way, the selection signal M/D is held in the data latch circuit 33 and supplied to the synchronization switching controller 34. Upon detection of a change in the selection signal M/D supplied from the data latch circuit 33, the synchronization switching controller 34 corrects the selection signal M/D for a changing timing such that the change is synchronized to the divided clock signal DCK or multiplied clock signal MCK, and supplies the selector 35 with the corrected selection signal M/D as the selection signal SL3.

For example, when the selection signal M/D changes from "L" at which the divided clock signal DCK is selected to "H" at which the multiplied clock signal MCK is selected, the selection signal SL3 is switched from "L" to "H" at a timing at which the multiplied clock signal MCK changes from "L" to "H." Also, when the selection signal M/D changes from "H" at which the multiplied clock signal MCK is selected to "L" at which the divided clock signal DCK is selected, the selection signal SL3 is switched from "H" to "L" at a timing at which the divided clock signal DCK changes from "L" to "H" while the multiplied clock signal MCK is at "H." In this way, the selector 35 selects one of the divided clock signal DCK and multiplied clock signal MCK to switch to the selected signal in synchronism with the divided clock signal DCK or multiplied clock signal MCK, and outputs the selected signal as the bus clock signal BCK.

The selector 30 selects one of the multiplied clock signal MC and multiplied clock signal MC1, and outputs the selected signal as the multiplied clock signal MC2 in accordance with the selection signal SL1 set in the setting register 13a. Further, the selector 31 selects one of the multiplied clock signal MC2 and an inverted version /MC2 of the multiplied clock signal MC2, and outputs the selected signal as the multiplied clock signal MCK in accordance with the selection signal SL2 set in the setting register 13a. Therefore, one of four multiplied clock signals can be selected by a combination of the selection signals SL1, SL2.

In this way, the clock control circuit 20 of this embodiment generates the bus clock signal BCK which rises at a timing different from the master clock signal CLK, and supplies the bus clock signal BCK to the processor 11 and input/output circuit 12, so that the processor 11 does not operate at the same timing as the input/output circuit 12, thus providing such advantages as a reduction in voltage margin due to an instantaneous voltage drop, a reduction in noise caused by simultaneous switching of transistors within the circuit, and a reduction in the influence of malfunctions associated with the noise.

Also advantageously, a fast reference clock signal is not required, and the frequency and timing can be readily switched in a simple circuit configuration.

The present invention is not limited to the foregoing embodiment, but can be modified in a variety of manners. Such exemplary modifications may include the followings, by way of example.

(a) The type and number of divided clock signals DC generated by the divider 22 are not limited to the illustrated ones but are arbitrary.

(b) The number of the multiplied clock signals MC which can be generated by the multiplier 25 is not limited the illustrated one, but is arbitrary.

(c) The division value DN, multiplication value MN, and selection signals SL1, SL2 may not be supplied from the setting register 13a, but may be applied from external terminals.

(d) When the division value DN need not be changed after the initial settings, the data holding register 23 may be removed such that the division value DN is directly supplied to the selector 24.

(e) When the selection signal M/D need not be switched after the initial settings, the data latch circuit 33 and synchronization switching controller 34 may be removed such that the selection signal M/D is directly supplied to the selector 35.

Figure 4:
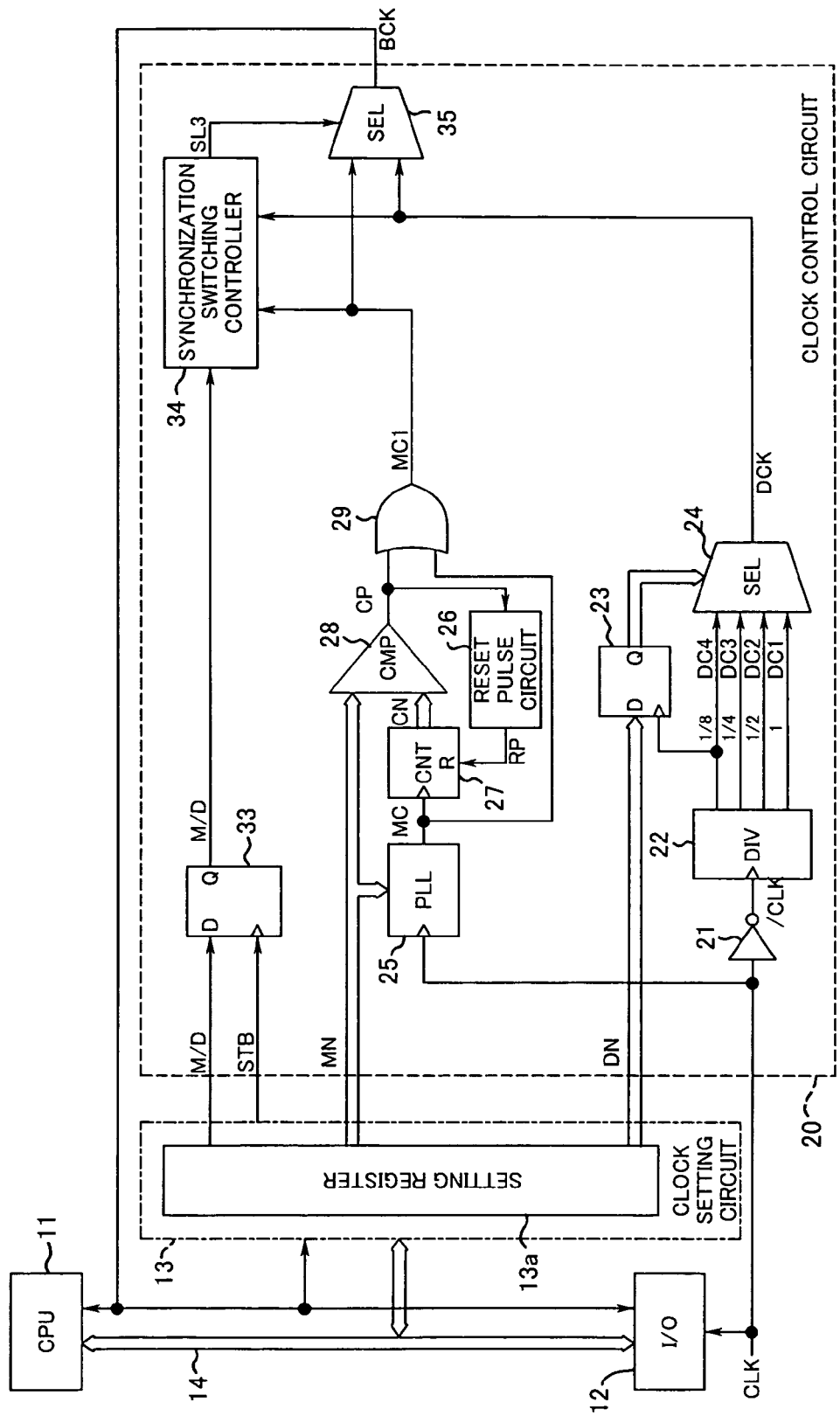
FIG. 4 is a diagram showing the configuration of a clock control circuit according to another embodiment of the present invention.

(f) As shown in FIG. 4, the selectors 30, 31 may be removed such that the multiplied clock MC1 output from the logical OR gate 29 is directly supplied to the selector 35.

Figure 5:
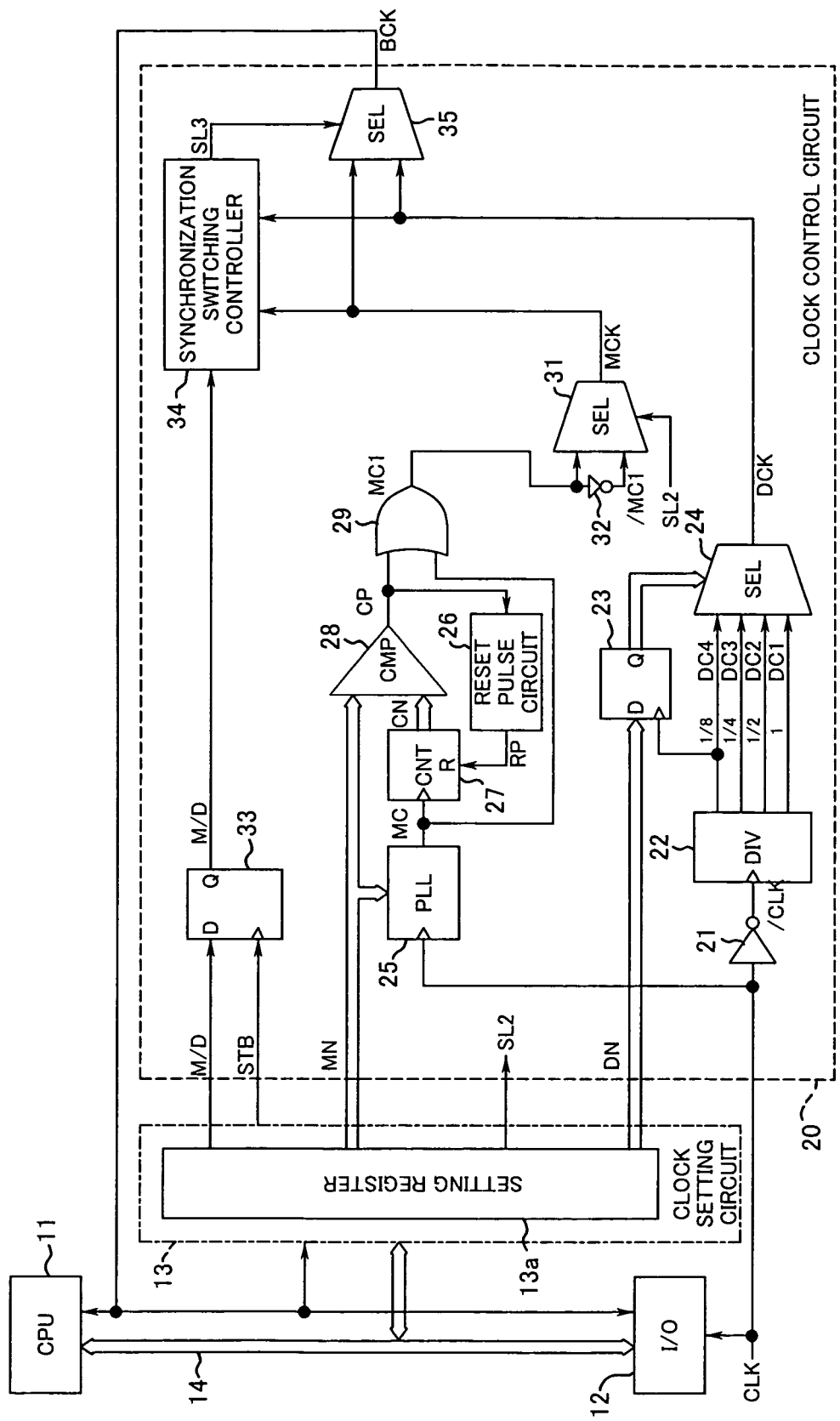
FIG. 5 is a diagram showing the configuration of a clock control circuit according to another embodiment of the present invention.

(g) As shown in FIG. 5, the selector 30 may be removed such that the multiplied clock signal MC1 output from the logical OR gate 29 is directly supplied to the selector 31.

Figure 6:
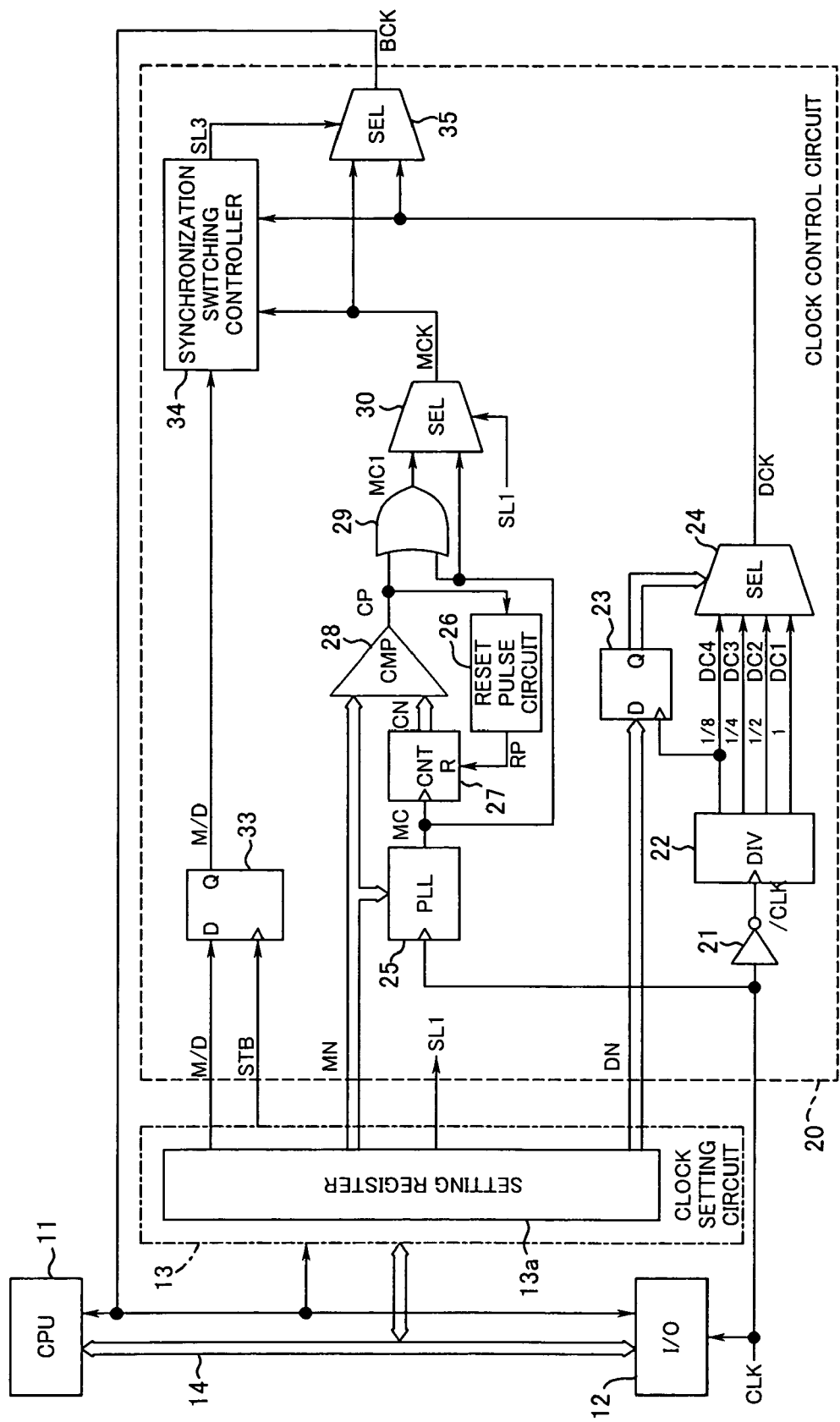
FIG. 6 is a diagram showing the configuration of a clock control circuit according to another embodiment of the present invention.

(h) As shown in FIG. 6, the selector 31 may be removed such that the multiplied clock MC2 output from the selector 30 may be directly supplied to the selector 35.

What is claimed is:

1. A clock control circuit built in a semiconductor integrated circuit including an input/output circuit for performing an input/output operation based on an external master clock signal, and a processor for performing control operation in accordance with a program, to generate a reference bus clock signal which is the basis for the operation of said processor, based on the master clock signal, said clock control circuit comprising:
    a divider unit which divides the master clock signal in response to a falling timing of the master clock signal to generate a divided clock signal;
    a multiplier unit which multiplies a frequency of the master clock signal by n (where n is an integer equal to or larger than three) to generate a multiplied signal synchronized to a rising timing of the master clock signal;
    a counter which is reset each time the master clock signal rises, and counts up one by one each time the multiplied signal rises;
    a comparator which outputs a comparison result signal at a first level when a count value of said counter is less than n−1, and sets the comparison result signal to a second level different from the first level when the count value is n−1;
    a logical OR gate which outputs a logical OR of the comparison result signal and the multiplied signal to output a multiplied clock signal; and
    a selector unit which selects one of the divided clock signal and the multiplied clock signal and outputs the signal selected by said selector unit as the reference bus clock signal.

2. A clock control circuit according to claim 1, wherein said selector unit selects one of the divided clock signal and the multiplied clock signal in accordance with a selection signal, and outputs the selected signal as the reference bus clock signal.

3. A clock control circuit according to claim 1, further comprising a register for use by said processor to set therein a division value for said divider unit, a multiplication value for said multiplier unit, or a selection signal for said selector unit.

4. A clock control circuit according to claim 1, wherein said selector unit comprises:
    a first selector which selects one of the output signal of said logical OR gate and the multiplied signal in accordance with a first selection signal, and outputs the signal selected by said first selector as a multiplied bus clock signal; and
    a second selector which selects one of the divided clock signal and the multiplied bus clock signal in accordance with a second selection signal, and outputs the signal selected by said second selector as the reference bus clock signal.

5. A clock control circuit according to claim 1, wherein said selector unit comprises:
    a first selector which selects one of the output signal of said logical OR gate and an inverted version of the output signal of said logical OR gate in accordance with a first selection signal, and outputs the signal selected by said first selector as a multiplied bus clock signal; and
    a second selector which selects one of the divided clock signal and the multiplied bus clock signal in accordance with a second selection signal, and outputs the signal selected by said second selector as the reference bus clock signal.

6. A clock control circuit according to claim 1, wherein said selector unit comprises:
    a first selector which selects one of the output signal of said logical OR gate and the multiplied signal in accordance with a first selection signal, and outputs the signal selected by said first selector;
    a second selector which selects one of the output signal of said first selector and an inverted version of the output signal of said first selector in accordance with a second selection signal, and outputs the signal selected by said second selector as a multiplied bus clock signal; and
    a third selector which selects one of the divided clock signal and the multiplied bus clock signal output from said second selector in accordance with a third selection signal, and outputs the signal selected by said third selector as the reference bus clock signal.

7. A clock control circuit built in a semiconductor integrated circuit including an input/output circuit for performing an input/output operation based on an external master clock signal, and a processor for performing a control operation in accordance with a program, to generate a reference bus clock signal which is the basis for the operation of said processor, based on the master clock signal, said clock control circuit comprising:
    a divider unit which divides the master clock signal in response to a falling timing of the master clock signal to generate a divided clock signal;
    a multiplier unit which multiplies a frequency of the master clock signal by n (where n is an integer equal to or larger than three) to generate a multiplied signal synchronized to a rising timing of the master clock signal;
    a counter which is reset each time the master clock signal rises, and counts up one by one each time the multiplied signal rises;

a comparator which outputs a comparison result signal at a first level when a count value of said counter is less than n−1, and sets the comparison result signal to a second level different from the first level when the count value is n−1;

a logical OR gate which outputs a logical OR of the comparison result signal and the multiplied signal;

a first selector which selects one of an output signal of said logical OR gate and the multiplied signal in accordance with a first selection signal, and outputs the signal selected by said first selector as a multiplied bus clock signal; and a second selector which selects one of the divided clock signal and the multiplied bus clock signal in accordance with a second selection signal, and outputs the signal selected by said second selector as the reference bus clock signal.

8. A clock control circuit according to claim 7, further comprising a register for said processor to set a division value for said divider unit, a multiplication value for said multiplier unit, or the selection signals.

9. A clock control circuit built in a semiconductor integrated circuit including an input/output circuit for performing an input/output operation based on an external master clock signal, and a processor for performing a control operation in accordance with a program, to generate a reference bus clock signal which is the basis for the operation of said processor, based on the master clock signal, said clock control circuit comprising:

a divider unit which divides the master clock signal in response to a falling timing of the master clock signal to generate a divided clock signal;

a multiplier unit which multiplies the frequency of a master clock signal by n (where n is an integer equal to or larger than three) to generate a multiplied signal synchronized to a rising timing of the master clock signal;

a counter which is reset each time the master clock signal rises, and counts up one by one each time the multiplied signal rises;

a comparator which outputs a comparison result signal at a first level when a count value of said counter is less than n−1, and sets the comparison result signal to a second level different from the first level when the count value is n−1;

a logical OR gate which outputs a logical OR of the comparison result signal and the multiplied signal;

a first selector which selects an output signal of said logical OR gate and the multiplied signal in accordance with a first selection signal, and outputs the signal selected by said first selector;

a second selector which selects one of an output signal of said first selector and an inverted version of the output signal of said first selector in accordance with a second selection signal, and outputs the signal selected by said second selector as a multiplied clock signal; and a third selector which selects one of the divided clock signal and the multiplied clock signal in accordance with a third selection signal, and outputs the signal selected by said third selector as the reference bus clock signal.

10. A clock control circuit according to claim 9, further comprising a register for use by said processor to set therein a division value for said divider unit, a multiplication value for said multiplier unit, or the selection signals.

* * * * *